United States Patent
Ragothaman et al.

(10) Patent No.: US 11,431,800 B2
(45) Date of Patent: Aug. 30, 2022

(54) SYSTEMS AND METHODS FOR RECORDING AN INDETERMINISTIC TRANSACTION ON A DISTRIBUTED LEDGER NETWORK

(71) Applicant: AQILLIZ PTE. LTD., Singapore (SG)

(72) Inventors: Gowthaman Ragothaman, Singapore (SG); Edison Lim Jun Hao, Singapore (SG)

(73) Assignee: AQILLIZ PTE. LTD., Singapore (SG)

( * ) Notice: Subject to any disclaimer, the term of this patent is extended or adjusted under 35 U.S.C. 154(b) by 0 days.

(21) Appl. No.: 17/588,892

(22) Filed: Jan. 31, 2022

(65) Prior Publication Data

US 2022/0247818 A1  Aug. 4, 2022

(30) Foreign Application Priority Data

Feb. 1, 2021 (SG) .............................. 10202101048P

(51) Int. Cl.
*H04L 67/1097* (2022.01)
*H04L 67/1095* (2022.01)
(Continued)

(52) U.S. Cl.
CPC ...... *H04L 67/1097* (2013.01); *G06F 16/2458* (2019.01); *G06F 16/24556* (2019.01);
(Continued)

(58) Field of Classification Search
CPC ... H04L 67/1097; H04L 9/32; H04L 67/1095; H04L 2209/38; G06F 16/27; G06F 16/2458; G06F 16/24556
See application file for complete search history.

(56) References Cited

U.S. PATENT DOCUMENTS 10,715,331 B2 * 7/2020 Davis ................. G06Q 20/3678
2019/0129895 A1 * 5/2019 Middleton .............. H04L 63/12
(Continued)

FOREIGN PATENT DOCUMENTS

CN  109447635 A   3/2019
EP   3720041 A1  10/2020

OTHER PUBLICATIONS

Office Action dated Mar. 15, 2021 for Singaporean Application No. 10202101048P.
(Continued)

*Primary Examiner* — Arvin Eskandarnia
(74) *Attorney, Agent, or Firm* — Eschweiler & Potashnik, LLC

(57) ABSTRACT

A computer-implemented method and system of recording an indeterministic transaction on a distributed ledger network is described. The method comprises (a) selecting a transaction from a transaction pool; (b) determining if the transaction comprises a deterministic transaction or an indeterministic transaction, if the transaction comprises the indeterministic transaction, sending the indeterministic transaction to an off-chain controller, marking the indeterministic transaction as a pending indeterministic transaction, attaching an identifier to the pending indeterministic transaction, and proceeding to step (c), if the transaction comprises the deterministic transaction, computing a new state in an update to a ledger, updating a status of a second indeterministic transaction in the off-chain controller if the deterministic transaction comprises a second identifier of the second indeterministic transaction; and proceeding to step (c); (c) determining if a target update time or a maximum update size is reached. Other steps are also described herein.

20 Claims, 6 Drawing Sheets

(51) Int. Cl.
  *H04L 9/32*       (2006.01)
  *G06F 16/2458*    (2019.01)
  *G06F 16/27*      (2019.01)
  *G06F 16/2455*    (2019.01)

(52) U.S. Cl.
  CPC ............... *G06F 16/27* (2019.01); *H04L 9/32* (2013.01); *H04L 67/1095* (2013.01); *H04L 2209/38* (2013.01)

(56) References Cited

U.S. PATENT DOCUMENTS

| | | |
|---|---|---|
| 2021/0174357 A1 | 6/2021 | Kano et al. |
| 2021/0297253 A1* | 9/2021 | Irazabal ................. G06F 16/28 |

OTHER PUBLICATIONS

Response to Office Action dated May 5, 2021 for Singaporean Application No. 10202101048P.
Notice of Eligibility for Grant dated May 20, 2021 for Singaporean Application No. 10202101048P.
Certificate of Grant and Specification dated Jun. 30, 2021 for Singaporean Application No. 10202101048P.

* cited by examiner

DSP

| Timestamp | | Impression ID | Campaign ID | Advertiser ID | Domain | Deal ID |
|---|---|---|---|---|---|---|
| 1 Jan 2020 | 03:13:45 | z2r4zsj2whzof9rd63oke3s63qzomu3ddfnj | 929919 | 5178081 | sample-site.com | 1130695 |
| 1 Jan 2020 | 03:13:46 | 1vclvw5tby3asmzg72hwne0x1m8r4bnuind9 | 929919 | 5178081 | sample-site.com | 1130695 |
| 1 Jan 2020 | 03:13:46 | pv61wg26ekd1c6sx7hnrggy7x17mpfhd2nb | 929919 | 5178081 | sample-site.com | 1055971 |
| 1 Jan 2020 | 03:13:47 | ar2dx61koumw7614ehmne2eua86weyoih0c | 929919 | 5178081 | sample-site.com | 1055971 |
| 1 Jan 2020 | 03:13:47 | trxc0o2dgqx073njeji5mkmi27or0jvq | 929919 | 5178081 | sample-site.com | 1055971 |

DSP

| Timestamp | | Impression ID | Campaign ID | Advertiser ID | Domain | Deal ID |
|---|---|---|---|---|---|---|
| 1 Jan 2020 | 03:13:45 | z2r4zsj2whzof9rd63oke3s63qzomu3ddfnj | 929919 | 5178081 | sample-site.com | 1130695 |
| 1 Jan 2020 | 03:13:46 | 1vclvw5tby3asmzg72hwne0x1m8r4bnuind9 | 929919 | 5178081 | sample-site.com | 1130695 |
| 1 Jan 2020 | 03:13:46 | pv61wg26ekd1c6sx7hnrggy7x17mpfhd2nb | 929919 | 5178081 | sample-site.com | 1055971 |
| 1 Jan 2020 | 03:13:47 | ar2dx61koumw7614ehmne2eua86weyoih0c | 929919 | 5178081 | sample-site.com | 1055971 |
| 1 Jan 2020 | 03:13:47 | jk8sjbqxidgt5s1ed648o01mg1c01vd0r | 929919 | 5178081 | sample-site.com | 1055971 |

Verifier

| Timestamp | | Impression ID | Campaign ID | Advertiser ID | Domain | InviewViewable | BrandSafe | Country |
|---|---|---|---|---|---|---|---|---|
| 1 Jan 2020 | 03:13:45 | z2r4zsj2whzof9rd63oke3s63qzomu3ddfnj | 929919 | 5178081 | sample-site.com | 1 | 1 | Singapore |
| 1 Jan 2020 | 03:13:46 | 1vclvw5tby3asmzg72hwne0x1m8r4bnuind9 | 929919 | 5178081 | sample-site.com | 0 | 0 | Singapore |
| 1 Jan 2020 | 03:13:46 | oaii42nrkywn1con4bvi6exsrg36s9ifc | 929919 | 5178081 | sample-site.com | 1 | 1 | Singapore |
| 1 Jan 2020 | 03:13:47 | ar2dx61koumw7614ehmne2eua86weyoih0c | 929919 | 5178081 | sample-site.com | 1 | 1 | Singapore |

Fig. 4

SYSTEMS AND METHODS FOR RECORDING AN INDETERMINISTIC TRANSACTION ON A DISTRIBUTED LEDGER NETWORK

CROSS-REFERENCE TO RELATED APPLICATION

This Application claims the benefit of priority to Singaporean Application number 10202101048P, filed on Feb. 1, 2021, the contents of which are hereby incorporated by reference in their entirety.

TECHNICAL FIELD

The present invention relates generally to systems and methods to record an indeterministic transaction on a distributed ledger network.

BACKGROUND

Distributed ledger networks, like blockchain, allow transactions to be recorded among the nodes in the network and provide an immutable history of the recorded transactions. As such there is growing interest in many industries to apply distributed ledger networks to various applications.

However, there are situations where the scale of data involved is too voluminous to be stored on the blockchain directly or is not practical based on the hardware available. Furthermore, not all forms of data should or can be stored immutably on a ledger (e.g Personal Data). In such a case where data is not stored on the blockchain itself, data must be stored in an offchain source (i.e. outside of the distributed ledger network or blockchain), and data queries must be made to that offchain source. This creates a technical problem as such queries are non-deterministic, and such a method of fetching data is unilateral (from offchain to blockchain)—with the implication that the query-to-completion cycle is not transparent and thus creates a doubt as to the authenticity of the transaction record.

SUMMARY OF INVENTION

In a first aspect, there is provided a computer-implemented method of recording an indeterministic transaction on a distributed ledger network. In particular, the method by be implemented by a node among the plurality of nodes in the distributed ledger network. The method comprises:
(a) selecting a transaction from a transaction pool;
(b) determining if the transaction comprises a deterministic transaction or an indeterministic transaction;
(i) if the transaction comprises the indeterministic transaction, sending the indeterministic transaction to an off-chain controller, marking the indeterministic transaction as a pending indeterministic transaction, attaching an identifier to the pending indeterministic transaction, and proceeding to step (c);
(ii) if the transaction comprises the deterministic transaction, computing a new state in an update to a ledger, updating a status of a second indeterministic transaction in the off-chain controller if the deterministic transaction comprises a second identifier of the second indeterministic transaction; and proceeding to step (c);
(c) determining if a target update time or a maximum update size is reached;
(i) if the target update time or the maximum update size is not reached, return to step (a);
(ii) if the target update time or the maximum update size is reached, proceed to step (d);
(d) updating the ledger;
(e) synchronising the off-chain controller with other off-chain controllers in the distributed ledger network; and
(f) if selected as an authoring node, sending pending indeterministic transactions stored in the off-chain controller to an off-chain source for fulfilment of the transaction.

Preferably, the method further comprises repeating steps (a) to (f).

Preferably, the method further comprises receiving the transaction and storing the transaction in the transaction pool.

Preferably, the indeterministic transaction comprises querying a database, and wherein sending any pending transactions stored in the off-chain controller to an off-chain source comprises sending a query to the database with the identifier.

In an example, the database comprises a federation server and a plurality of private data storage, and wherein sending the query to the database with the identifier comprises sending the query from the off-chain controller to the federation server. The federation server may be configured to receive and validate the query from the off-chain controller, prepare a query distribution plan, facilitate a fulfilment of the query by the plurality of private data storage, and sends the identifier back to the authoring node as a third deterministic transaction. The authoring node processes the identifier as a deterministic transaction as above and records the fulfilment of the query including both success and failure of the query. The query result data set may also be sent to the node either in the form of the raw data and/or aggregated data.

Preferably, updating a status of the second indeterministic transaction in the off-chain controller comprises changing the status from pending to completed.

Preferably, the method further comprises applying timeout logic to fail the pending indeterministic transaction; and sending the identifier of the failed indeterministic transaction back to the transaction pool. More preferably, the method further comprises recording the identifier of the failed indeterministic transaction; and creating a new indeterministic transaction with a new identifier to retry the failed indeterministic transaction. Advantageously, this prevents off-chain requests from being repeatedly sent out which may clog up the network and database, and allows for the failed transactions to be resent without requiring further intervention.

Preferably, upon determining that the transaction is the deterministic transaction, the method further comprises validating the deterministic transaction. By validating the transaction, the authenticity of the transaction is verified before it is added to the update to the ledger. Validation of the transaction depends in part on the distributed ledger network's setup and may be done when the update to the ledger is being prepared by each node (i.e. before the node computes a new state in the update). In addition, validation may be done when each node receives the update from the authoring node (thus the nodes verify that the transactions in the update to the ledger are authentic).

Preferably, the method further comprises selecting the authoring node by a consensus protocol. The preparation of the update and selection of the authoring node may be concurrently executed by one or more processors or modules in the node.

Preferably, the distributed ledger network is a blockchain and computing a new state in an update to a ledger comprises computing a new state in an upcoming new block.

Preferably, selecting the transaction from the transaction pool to be validated is based sequentially on a transaction fee and a nonce of the transaction.

Preferably, if the node is the authoring node, updating the ledger comprises sending out the update to the plurality of nodes, otherwise updating the ledger comprises receiving the update from the authoring node. More preferably, if the node is not the authoring node, updating the ledger further comprises validating the update; accepting the update into the ledger; and indicating to the distributed ledger network that the ledger has been updated. This allows the nodes in the distributed ledger network to verify that the transactions in the update are valid and to maintain a verified and common ledger amongst the nodes.

In a second aspect, there is provided a non-transitory computer readable medium comprising instructions that, when executed on a computer, perform the method of recording an indeterministic transaction on a distributed ledger network according to the first aspect.

In a third aspect, there is provided a node comprising a processor; a transaction pool; a ledger; a networking module to communicate with other devices; an off-chain controller; and a non-transitory computer readable medium comprising instructions that, when executed on a computer, perform the method of recording an indeterministic transaction on a distributed ledger network according to the first aspect. The node may further comprise chain code and other components to allow the node to function in the distributed ledger network, for example cryptography modules, transaction handlers, consensus algorithm module.

In a fourth aspect, there is provided a system comprising a plurality of nodes according to the third aspect; and the database. In an embodiment, the database comprises a federation server and a plurality of private data storage.

In an embodiment, the federation server comprises a federation server processor, a federation server storage, and a non-transitory computer readable medium comprising instructions that, when executed by the federation server processor, perform a method of fulfilling a database query, the method comprising receiving and validating the database query from the off-chain controller of the authoring node by the federation server processor; preparing a query distribution plan by the federation server processor, facilitating a fulfilment of the query by the plurality of private data storage by the federation server processor to generate a query result set with the identifier, and sending the identifier back to the authoring node by the federation server processor.

In an embodiment, the query result set comprises raw data of the query result and/or aggregated data of the query result.

In an embodiment, each private data storage is configured with personalised access control rules to determine if the query should be fulfilled by the individual private data storage.

In an embodiment, each private data storage is configured to apply differential privacy in fulfilling the database query.

In an embodiment, the distributed ledger network is a blockchain.

The methods, system and hardware described allows for an indeterministic transaction like a database query to be recorded on a distributed ledger network to provide a complete record trail of the query from initiation to completion.

DETAILED DESCRIPTION

In the Figures:

FIG. 3b shows a continuation of the flowchart of FIG. 3a;

FIG. 4 shows an example of data used in an embodiment of the invention;

Figure 1:
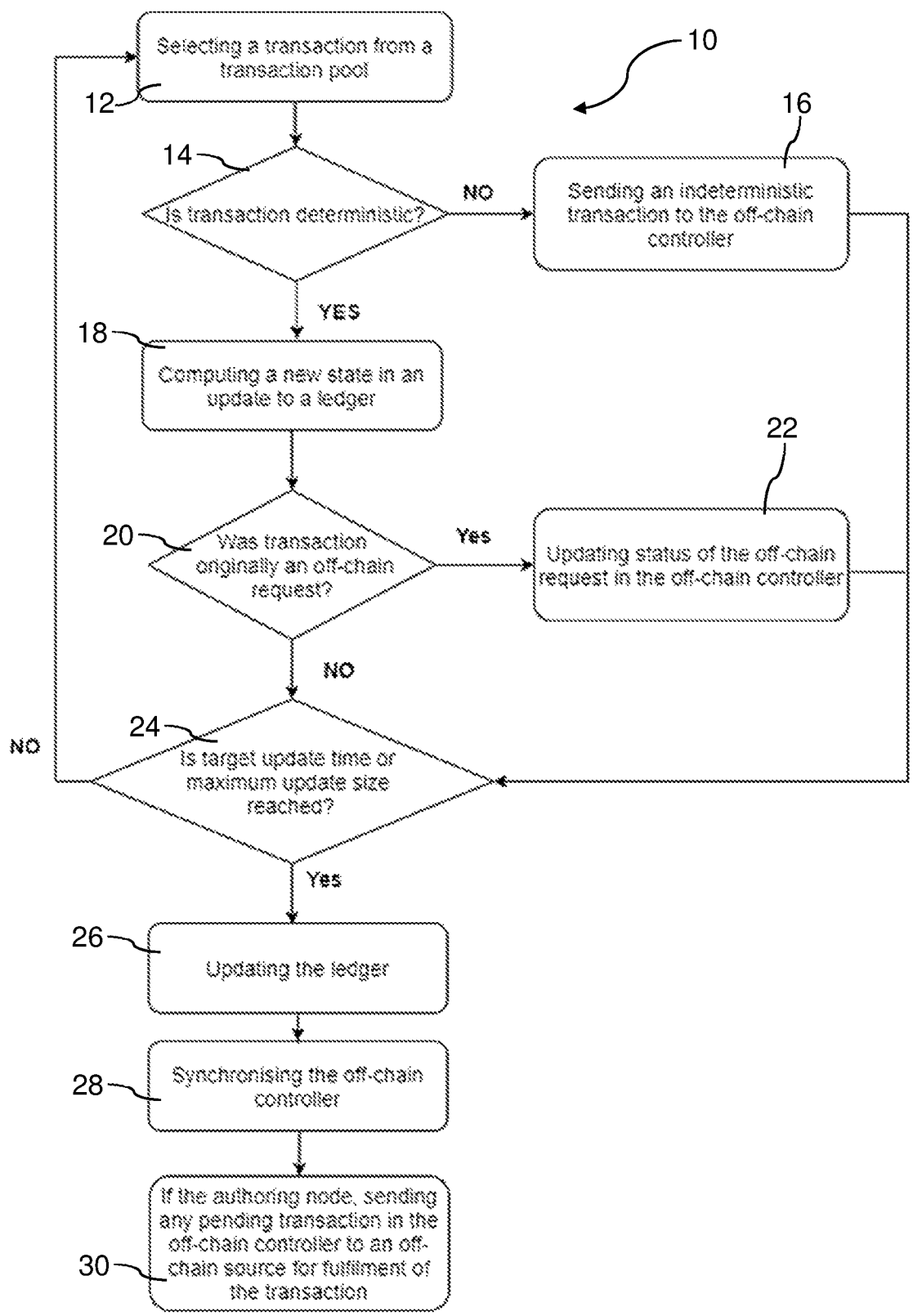
FIG. 1 shows a flowchart of an embodiment of the invention.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

Unless defined otherwise, all technical and scientific terms used herein have the meaning commonly understood by a person skilled in the art to which this invention belongs.

As used herein, the articles "a", "an" and "the" as used with regard to a feature or element include a reference to one or more of the features or elements. As used herein, the term "and/or" includes any and all combinations of one or more of the associated listed items. As used herein, the terms "first," "second," and "third," etc. are used merely as labels, and are not intended to impose numerical requirements on their objects. As used herein, the term "each other" denotes a reciprocal relation between two or more objects, depending on the number of objects involved.

Where a combination is disclosed, each subcombination of the elements of that combination is also specifically disclosed and is within the scope of the invention. Conversely, where different elements or groups of elements are disclosed, combinations thereof are also disclosed. Where any element of an invention is disclosed as having a plurality of alternatives, examples of that invention in which each alternative is excluded singly or in any combination with the other alternatives are also hereby disclosed; more than one element of an invention can have such exclusions, and all combinations of elements having such exclusions are hereby disclosed.

The following detailed description is merely exemplary in nature and is not intended to limit the invention or the application and uses of the invention. Furthermore, there is no intention to be bound by any theory presented in the preceding background of the invention or the following detailed description.

Other technical advantages may become readily apparent to one of ordinary skill in the art after review of the following figures and description.

A distributed ledger contains transactions of value that may change a state of the chain at a given time. Blockchain is a specific type of distributed ledger where transactions are chained into blocks which contains an ordered list of transactions and each block contains a hash that links the newly added block to the previous block.

Application code that typically runs on top of the blockchain, and distributed ledger network in general, is unable to interact with real-world events or data that sits outside the blockchain. Distributed ledger network and blockchain technology—as it now is—was infrastructurally designed to operate in a deterministic manner since determinism is a crucial prerequisite for the nodes to reach a consensus. A deterministic transaction is a transaction where each node in the network must be able to fetch the same results for a given input at any point of time. Data that is not stored on-chain is therefore not deterministic as the data resides in another external source, which may or may not be made available to every node. A deterministic program would behave the same way anytime it is executed or would behave in a manner consistent with its logical design. An example of a deterministic program would be a computer function that computes arithmetic of two integers. In contrast, an example of an indeterministic (or non-deterministic) program is a function to fetch data from an API. (e.g current exchange rate of SGD to USD). As examples, a transaction involving the arithmetic computation of integers is a deterministic transaction, while a transaction involving the query of a database is an indeterministic transaction since it requires a remote network request. Without determinism, blockchain nodes that execute the same application code might obtain a different result, resulting in an unintended consensus failure.

It therefore follows that determinism is crucial to avert consensus failure, and that non-deterministic transactions and/or programmes would invite unintended consensus failure of the blockchain and distributed ledger in general.

Current blockchain protocols require computations to be deterministic. However, external data in the real world such as exchange rates are non-deterministic. In order to access external data, such offchain data must be fetched via APIs and/or require integrations with Oracles into the blockchain.

Database queries, in particular federated database queries are an example of the aforesaid non-deterministic query. When data is not stored on the chain (off-chain), it is likely that nodes may obtain different results depending on the time that the retrieval occurs due to changes in database states or network errors and hence are not deterministic. Blockchains protocols such as Ethereum or Bitcoin cannot handle indeterministic functions such as federated database queries.

Even with the development of technologies pertaining to Oracles, where off-chain data can be communicated to the blockchain, the converse is not currently possible (i.e where a blockchain communicates to an off-chain source). The implication is that blockchain use cases which require communications between the blockchain and an off-chain data source is only unidirectional (from the offchain data source to the blockchain). Such access to external data is a unilateral communication of information from the external world into the blockchain. Methods and systems that allow communication from a blockchain protocol to an off-chain source—to establish query to completion provenance—have not been developed previously.

TownCrier (Fan et al. https://eprint.iacr.org/2016/168.pdf) is an example of a mechanism that feeds data into a blockchain in a centralised manner. TownCrier explores the possibility of authenticated data feed using a trusted hardware component as an intermediary between the blockchain and the data source. Using trusted hardware computing, proofs are published on the chain along with the results of the data feed. However, this method of data feed relies on a central authority viz a third-party server tasked to commit approved transactions on the blockchain within a timeframe. Moreover, while the TownCrier mechanism relies on an authenticated data feed, it does not have a mechanism to authenticate the validity of requests/queries but merely implements an upfront gas payment system in order to dissuade bogus requests and prevent distributed denial of service ("DDos") attacks. The TownCrier system does not contemplate a query-to-completion provenance on a blockchain ledger, where the Data Subject and/or Data Controller has transparency over the data life cycle—whilst also not storing such data on the chain.

FIG. 1 shows a flowchart depicting a method 10 of recording an indeterministic transaction of a distributed ledger network. The method 10 may be implemented by a computer, in particular a node 120 of the distributed ledger network. The method 10 may be used to record both deterministic and indeterministic transactions and provide a complete query-to-completion immutable record of the transactions, in particular an indeterministic transaction. The method 10 comprises selecting a transaction from a transaction pool 124. The first selection of the transaction may be regarded as the start of the consensus protocol round or validation round of the distributed ledger network. The method may further comprise providing the transaction pool 124 containing at least one transaction. Providing the transaction pool 124 may be by receiving a transaction and storing the transaction in the transaction pool 124. Each transaction is preferably sent to all the nodes 120 in the network either directly or indirectly via an intermediate node 120. A user 102 may send the transaction to a node 120 which broadcasts the transaction to all nodes 120 in the network. Examples of transactions could be: Type I: a function call to make arithmetic computation; Type II: a function call to update a value on the ledger directly; Type III: an identifier of a previous query result (and optionally with the query results such as status of the query and/or its response data); and Type IV: a query request to an off-chain database. Types I, and III are examples of a deterministic transaction, while Type IV is an example of an indeterministic transaction.

At step 14, it is determined whether the transaction comprises a deterministic transaction or an indeterministic transaction. If it is an indeterministic transaction (or non-deterministic transaction), the method 10 proceeds to step 16, sending the indeterministic transaction to an off-chain controller 128, marking the indeterministic transaction as a pending indeterministic transaction by the off-chain controller 128, attaching a unique identifier (for example, a Query identification number (ID No.) or a Job ID No.) to the pending indeterministic transaction, and proceeds to step 24.

If it is a deterministic transaction, the method 10 proceeds by preferably validating the deterministic transaction and computing a new state in an update to a ledger 130 (step 18). The validation of the transaction may be done at another step, for example after consensus is reached or when the new block is sent to all nodes, and depends in part on the consensus protocol used. At the next step 20, it is determined if the deterministic transaction was originally an off-chain request, in other words, whether the deterministic transaction contains an identifier of a previous indeterministic transaction (which is explained in greater detail below). For example, the presence of the identifier may be determined by checking whether the transaction contains an identifier that matches any identifier of pending indeterministic transactions stored in the off-chain controller 128. The result data set of the previous indeterministic transaction may be optionally provided with the identifier as well and/or may be stored in the off-chain controller 128, and may be accessed by the user.

If the deterministic transaction does not contain the identifier of a previous off-chain request (i.e. the identifier of a previous indeterministic transaction), the method 10 proceeds to step 24. If the deterministic transaction contains the identifier of a previous off-chain request (i.e. the identifier of a previous indeterministic transaction), the method 10 proceeds to step 22, updating the status of the off-chain request in the off-chain controller 128 (i.e. updating a status of the previous indeterministic transaction stored in the off-chain controller 128) and proceeding to step 24. For example, the status of the previous indeterministic transaction may be changed or updated from pending to completed. Thus, this allows the indeterministic transaction to be recorded on the ledger 130 from the start to the end of the transaction and provides complete provenance of the transaction while preventing consensus failure. Updating the status of the previous indeterministic transaction in the off-chain controller occurs if the deterministic transaction comprises an identifier of a previous indeterministic transaction and optionally the result data set of the previous indeterministic transaction.

At step 24, the method 10 determines if the target update time or maximum update size has been reached. If either condition is met, the method 10 proceeds to step 26, otherwise the method 10 returns to step 12 to select another transaction from the transaction pool and reiterates the steps above.

The nodes 120 in the distributed ledger network may employ a consensus protocol to determine which node 120 is selected as the authoring node 120a. Examples of a consensus protocol that may be used include Proof-of-Work consensus protocol, Proof-of-Stake consensus protocol, Delegated Proof-of-Stake consensus protocol, Proof-of-Authority consensus protocol, Byzantine Fault Tolerance consensus protocol, Delegated Byzantine Fault Tolerance consensus protocol, and Proof-of-Burn consensus protocol.

Thus, each node 120 selects transactions and prepares an update to the ledger while trying to achieve consensus using the consensus protocol to select the authoring node 120a concurrently. When one of the nodes 120 in the distributed ledger network is selected as the authoring node 120a by the consensus protocol, and either the target update time or maximum update size is reached, consensus is reached amongst the nodes 120 on the update to be added.

For example, in a Proof-of-Work blockchain like Bitcoin, the authoring node for the new block is the node that found a valid Proof-of-Work by calculating a cryptographic puzzle. In another example, a blockchain which uses an Authority-based consensus algorithm will involve having a list of authorities who will be selected based on a mechanism, which could be a weighted or unweighted round-robin mechanism or could be more complicated by calculating a function that could determine which node is the authoring node.

At step 26, updating of the ledger 130 is performed. If the node 120 has been selected as the authoring node 120a, the authoring node 120a broadcasts or sends out the update to all other nodes 120 (peer nodes) in the distributed ledger network. If the node is not the authoring node 120a, updating the ledger comprises receiving the update from the authoring node 120a.

The peer nodes 120 receive the new update and performs validation to ensure that transactions in the new block are valid. After confirming that the update and transactions are valid, each peer node 120 accepts the update by updating its ledger 130 with the new state. Each peer node 120 may indicate to the other nodes 120 in the network that the update has been accepted, for example by sending a signal to the network to indicate that their state is updated. Consensus is deemed to be completed when the entire or part of the network accepts the new state. The threshold to define "part of the network" is set by the chain configuration, and is usually 50% or more. No further updates to the past state are possible once the new update has been accepted by the network as valid and part of the new state of the ledger.

At step 28, synchronising of the off-chain controller 128 is done. In particular, the indeterministic transactions and their status are synchronised across the off-chain controllers 128 in the nodes 120 of the distributed ledger network. This may involve sending and receiving the record of pending indeterministic transactions between the nodes 120.

At step 30, if the node 120 is selected as the authoring node 120a by the nodes 120 in the network, the method further comprises sending pending indeterministic transactions stored in the off-chain controller 128 to an off-chain source for fulfilment of the transaction. This avoids duplicate requests from being sent to the off-chain source. Indeterministic transactions that have been marked as completed in the previous step would not be sent to the off-chain source.

In an embodiment, only pending indeterministic transactions which had been added in the just completed validation round is send to the off-chain controller, and any pending indeterministic transactions from previous validation rounds are not send out. This prevents repeated requests to the off-chain source and repeated responses. In an example, the method 10 may comprise applying a timeout logic to terminate pending indeterministic transactions. The timeout logic may be implemented by having the off-chain controller scan to check if the pending indeterministic transactions (from previous validation round/s) are completed before sending the newly added pending indeterministic transactions. If the pending transactions have not received a response within a stipulated timeframe, it is marked as "failed" (i.e. timeout). In an example, the user may not be informed, but a user may fetch the status of its transaction.

In another example, the failed indeterministic transaction may be sent back to the transaction pool as a new deterministic transaction to record the failure. Alternatively, the method 10 may send the terminated indeterministic transaction back to the transaction pool as a new indeterministic transaction to retry sending out the indeterministic transaction. In such a scenario, the indeterministic transaction further contains data indicating that it was originally an off-chain (indeterministic) request with the associated identifier, and the off-chain controller will first record the identifier as a failure. Then the off-chain controller will record a new off-chain job request (indeterministic transaction) with the same request payload and new identifier. Advantageously, this records the initial failure and resends out the off-chain request.

To prevent resource depletion that may arise from an infinite circular loop (i.e. transactions get retried multiple times), the maximum retries in the network may be limited by default to a number that can be configurable, for example during the initialisation of the network. Once the depth limit is reached, the identifier will be marked as a failed transaction and a corresponding error code "MAX_DEPTH REACHED".

The series of off-chain request retries is recorded in a "Off-chain transaction sequence", which is a Singly Linked List data structure where the root node is the identifier of the first off-chain request and the subsequent retries are sequentially appended to the Linked List. The depth of the off-chain request call is the length of the entire Linked List, and the tail of the Linked List is the current pending off-chain transaction.

In addition to a network-enforced depth limit, a manual cancellation may be made by submitting a new cancellation request which contains the identifier of the current pending off-chain request identifier. The request will enter a transaction pool as a deterministic transaction. The cancelled off-chain job identifier will be recorded on the ledger as a "Cancelled Transaction Pool" which is a storage facility similar to other on-chain data. Future off-chain fulfilment response objects which are cancelled by the user are then marked as a failed transaction and not retried any further.

Alternatively, a user can also send a transaction cancellation request with the original off-chain request identifier. In such a scenario, the off-chain controller will fetch the off-chain transaction sequence, search for the head of every pending off-chain request chain. Once found, the current pending off-chain can be identified by traversing through the linked list until the end of the Linked List is reached.

The off-chain source fulfils the transaction and sends the identifier of the transaction back to the authoring node 120a as a deterministic transaction to the transaction pool and the deterministic transaction is processed by the method 10 a second time as described above. The result data set either in the form of raw data or aggregated data may also be send back to the authoring node 120a as part of the transaction, or may be stored in the off-chain controller 128 or in the off-chain data source. Aggregated data is summarised data of the combined data set, for example it may be counts which fulfil the query. The method 10 thus allows for an indeterministic transaction to be recorded on the distributed ledger network without having consensus failure.

The method 10 described is applicable to a distributed ledger network in general and is done by a node 120 in the network. Depending on the network's configuration, all the nodes 120 may be identical or may have different functions and/or access rights. A specific example to illustrate the method is further described using blockchain. It will be apparent that the hardware and method described for the blockchain may be similarly applicable to distributed ledger networks in general with appropriate modifications to suit the network and vice versa.

Figure 2:
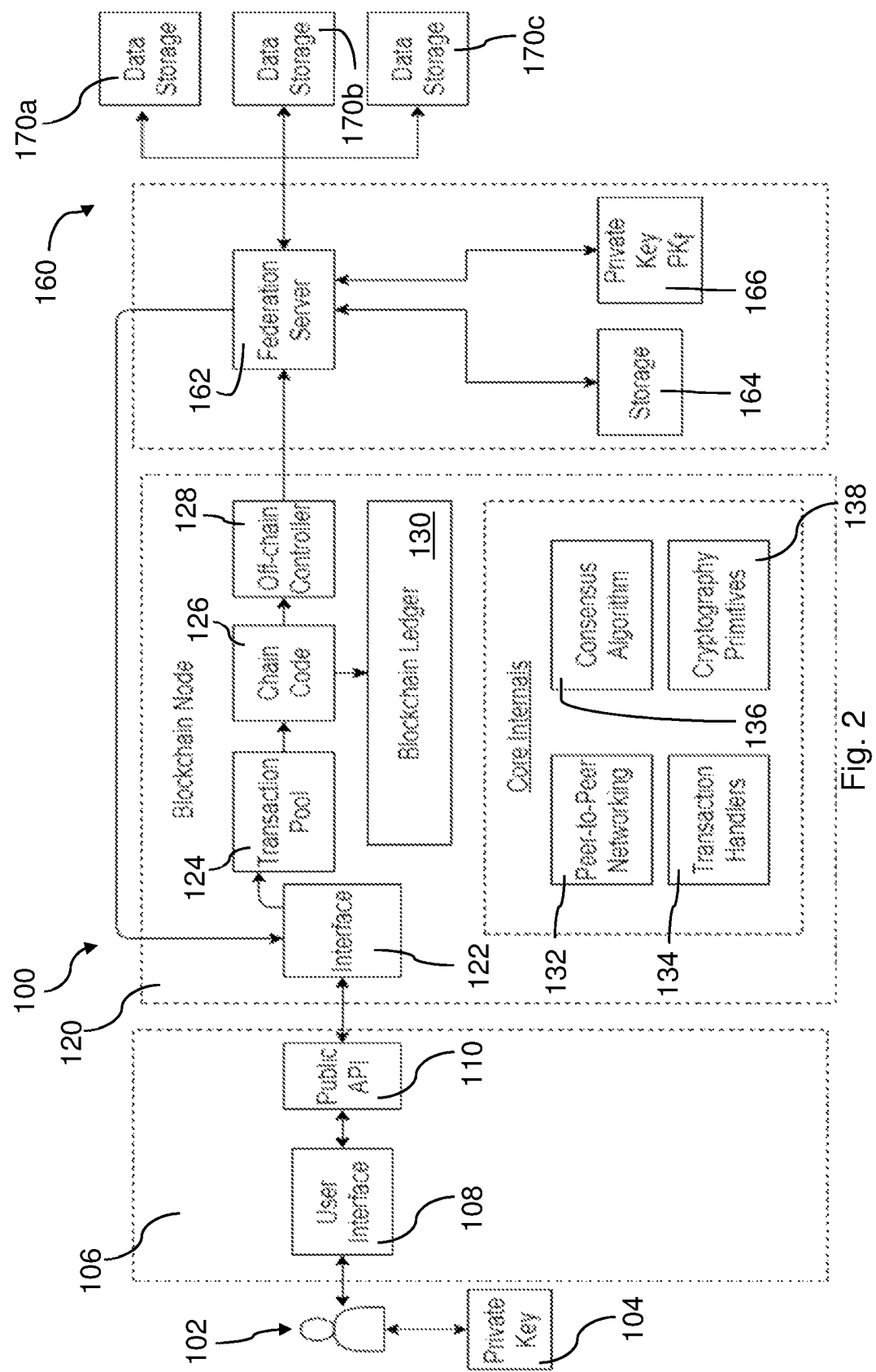
FIG. 2 shows a schematic layout of an embodiment of the invention.

FIG. 2 shows a schematic (or architectural) diagram of an embodiment of the system 100 to provide a query-to-completion provenance on a distributed ledger network, in particular a blockchain. The system 100 comprises a distributed ledger or blockchain and a database, in particular a federated database 160. A federated database 160 may be considered a composite of a plurality of autonomous databases and is explained in greater detail below. The distributed ledger network or blockchain comprises a plurality of nodes 120. FIG. 2 shows an example of a node 120 in communication with a user terminal 106 and a federated database 160. The node 120 would be connected to one or more other nodes 120 to form the distributed ledger network. One or more user terminals 106 may communicate or connect (i.e. to send and receive data) to any node 120 in the distributed ledger network, and each node 120 is able to communicate with the database. In an example, each node 120 communicates with a federated database through the federation server 162.

Each node 120 generally comprises a processor, a ledger 130, a transaction pool 124 (a storage medium to store pending transactions to be added to the ledger of the distributed ledger network), a peer-to-peer (P2P) networking module 132 to communicate with other devices in particular the other nodes 120, and an off-chain controller 128, and a non-transitory computer readable storage medium to store instructions when executed by the processor perform the methods 10, 200 of recording an indeterministic transaction in the ledger and distributed ledger network and other operations of the node 120. The medium may also be used to store the results of the indeterministic transaction. For example, if the indeterministic transaction is to query a database, the results of the query may be stored in the storage medium in the node 120.

An interface 122 may be provided to interact with a user terminal 106. In an example, the interface 122 may be a remote procedure call (RPC) application programme interface (API). A chain code 126 may be further provided that allows an indeterministic transaction to be recorded and is explained in greater detail below. Each node 120 may further comprise other core internals for example a consensus protocol (or consensus algorithm) module 136, a cryptography primitives module 138 and a transaction handler module 134. The core internals allow the node 120 to communicate securely with the other nodes 120 in the network to form the distributed ledger network. Briefly, the P2P networking module 132 allows the node 120 to communicate with the other nodes 120. The consensus algorithm module 136 allows the node 120 to implement the consensus protocol employed in the network. The cryptography primitives module 138 allows encryption of the communications between the nodes 120 and possibly the encryption and validation of the transactions. The transaction handler module 134 allows the node 120 to perform the required transactions. The processor and/or non-transitory computer readable medium may be part of and/or used to implement the operations of the core internals and other aspects of the node 120 as described.

The off-chain controller 128 is designed for external invocations with long-running and asynchronous communications that may not have a deterministic time of completion. The process is separated from the consensus protocol as the time of execution might exceed the time for consensus to be reached leading to consensus failure in the network. The off-chain controller 128 is used to communicate with an off-chain source, like a database or a federated database 160. In an example, in a blockchain the time taken for the off-chain request may take longer than the block time (the time for a new block to be added to the blockchain) leading to consensus failure. In an example, the off-chain request is to query a database. The time taken to query a database and return the results of the query depends on many factors including the complexity of the query, network conditions and the size of the database. These factors affect the time for the query to be completed thus such off-chain request and transaction are considered indeterministic.

As an example, the methods described herein may be used in a blockchain and the process may be as follows:

1. Node(s) 120 [Singular or plural, depends on the consensus algorithm] validate the transactions. For example, the first node 120 that receives the transaction may send the transaction out to other nodes 120, or it can send out the transaction for validation as part of the block to be added to the blockchain.

2. Each node 120 proposes a block by collecting transactions from transaction pool, validate transactions, compute new state, send indeterministic transactions to off-chain controllers.

3. An authoring node 120a is selected by the consensus protocol used in the blockchain.

4. The authoring node 120a broadcasts the new block to other peer nodes 120 when one of the two conditions are met:

(a) Target block time is reached (for example mine a new block once every seconds); or
(b) Capacity for new block (maximum block size) is reached.
5. Peer nodes 120 receives the new block and performs validation to ensure that transactions in the new block are valid.
6. Peer nodes 120 accepts the block by updating the ledger with the new state. Peer nodes sends a signal to the network to indicate that their state is updated. Consensus is deemed to be completed when the entire or part of the network accepts the new state. The threshold to define "part of the network" is set by the chain configuration and is usually 50% or more.
7. No further updates to the past state is possible once the block has been accepted by the nodes 120 as above and forms part of the accepted ledger in the network.

Figure 3A:
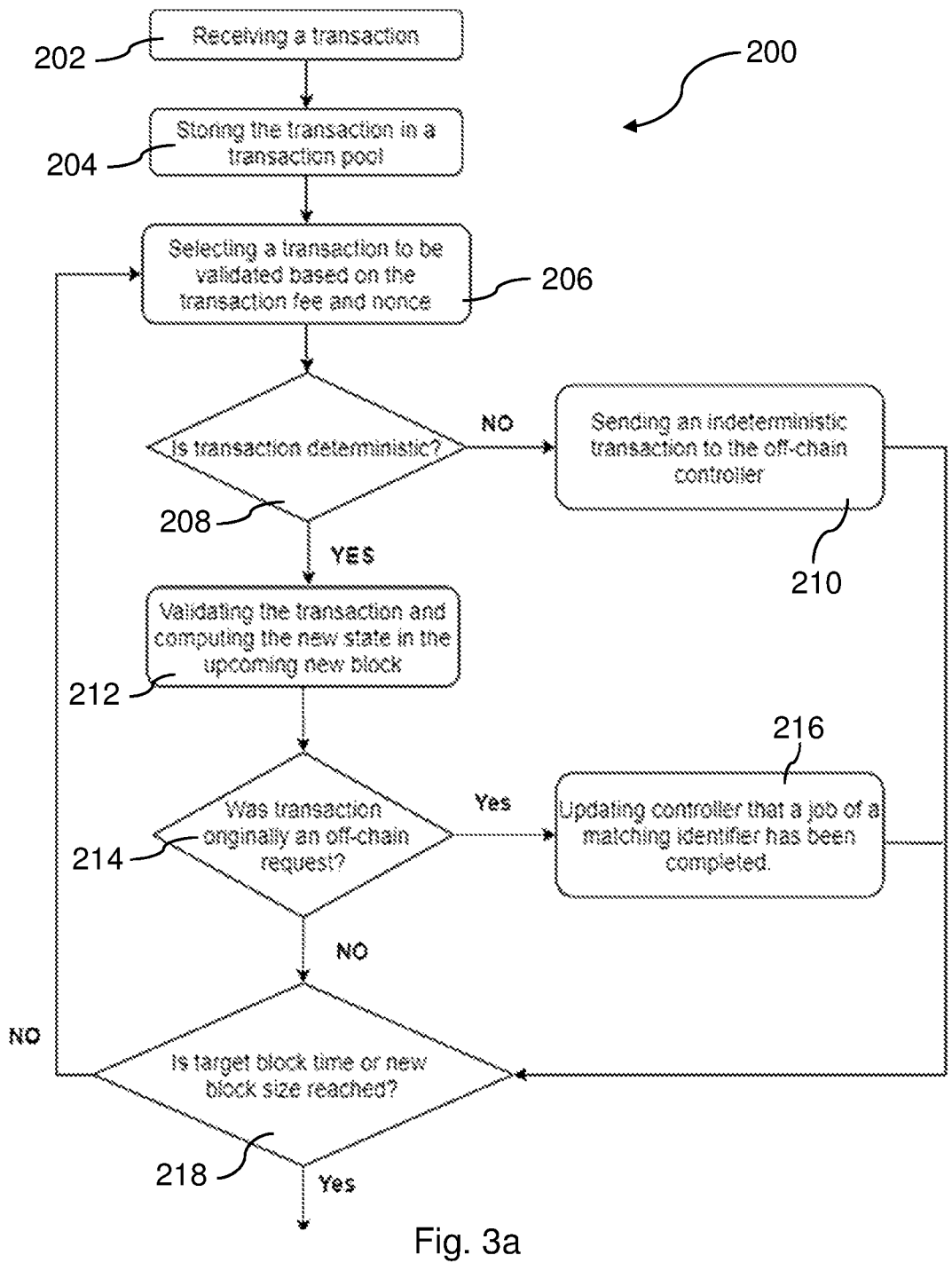
FIG. 3a shows a flowchart of an embodiment of the invention.
Figure 3B:
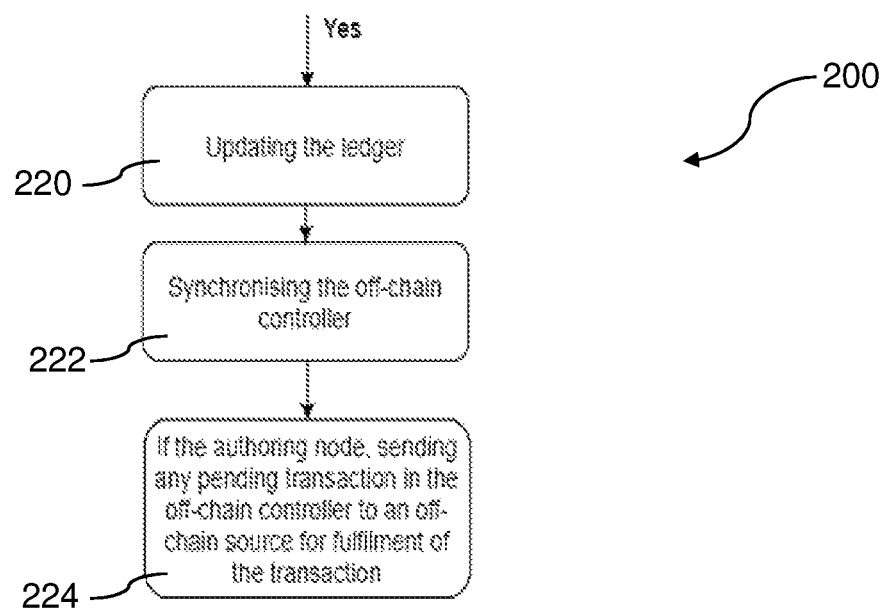

FIG. 3a and FIG. 3b (continuation of FIG. 3a) shows an example of a method 200 of recording an indeterministic transaction on a blockchain. At step 206, the method comprises selecting a transaction from a transaction pool 124. The selection may be based firstly on the transaction fee of the transaction (which is set by the user 102) and secondly on the nonce of the transaction. Each user 102 may be provided with a fixed amount of credits which may be used to pay the transaction fee and/or may purchase the credits. The value of the transaction fee may be determined by the user, and it should be more than or equals to the minimum fee required by the network. The minimum fee is computed based on a few factors such as the storage of the transaction, compute power required and/or number of transactions at a given time. Step 206 may also be regarded as the start of the validation round or consensus protocol round of the blockchain. The transaction pool 124 may be provided for by the node receiving a transaction from a user terminal 106 and storing the transaction in the transaction pool 124 as shown in steps 202 and 204. After receiving the transaction from the user terminal 106, the node 120 may broadcast the transaction to other nodes 120 in the network.

At step 208, it is determined if the transaction is deterministic. If the transaction is indeterministic, the method proceeds to step 210 where the indeterministic transaction is send to the off-chain controller 128. The off-chain controller 128 marks the indeterministic transaction as pending (i.e. a pending indeterministic transaction) and attaches a unique identifier to the pending indeterministic transaction, for example a query identification number (ID No.) or a Job ID No. After which it proceeds to step 218.

If the transaction is deterministic, the method proceeds to step 212 where validating of the transaction is preferably done and computing the new state of the blockchain in the upcoming new block (i.e. a candidate block) are performed. Validating the transaction is done by at least a majority of the nodes and preferably all the nodes as each node should contain the same transaction pool. Alternatively, validating the transaction may further comprise sending the transaction to a majority of the nodes and preferably all the nodes, to allow each node to independently verify the authenticity of the transaction. Validation of the transaction may be done at other steps of the method 200. For example, the validation may be done after consensus is reached and the new block is sent to all nodes 120. Alternatively, validation may be done at both points.

At step 214, it is determined whether the deterministic transaction was originally an off-chain request. This may be done by checking whether the deterministic transaction contains an identifier that matches any identifier of any pending indeterministic transactions in the off-chain controller 128. When a match is found, the transaction is determined to be originally an off-chain request. This allows the node 120 to identify that one of the pending indeterministic transactions stored in the off-chain controller 128 has completed its transaction. The query result set may be contained in the new deterministic transaction, stored in the off-chain controller 128 or stored in the off-chain source. The query result data set in the off-chain controller 128 may be accessed by the ledger or application code. Data stored in the off-chain source can be accessed by accessing the data directly or through another indeterministic transaction to access data stored in an off-chain source.

If the transaction contains the identifier of a previous indeterministic transaction, the method 200 proceeds to step 216 where the off-chain controller 128 is updated that the job (transaction) of a matching identifier has been completed. In other words, step 216 updates the off-chain controller 128 that a query result set with a matching identifier has been received and validated. The off-chain controller 128 subsequently updates the status of the previous indeterministic transaction, for example from pending to completed. This stops the off-chain controller from sending out an indeterministic transaction which has been fulfilled or completed. The method subsequently proceeds to step 218. The method 200 thus updates the status of the previous indeterministic transaction in the off-chain controller 128 if the deterministic transaction contains an identifier of the previous indeterministic transaction, The updating of the status occurs when a match of the identifiers is found after which the method proceeds to the next step 218. The timeout logic and the steps to handle a failed off-chain request (indeterministic transaction) described above similarly applies here.

If the transaction does not contain the identifier of a previous indeterministic transaction, the method 200 proceeds to step 218.

While the new block is being prepared by the node 120, the node 120 employs the consensus protocol used in the blockchain to select the authoring node 120a. Examples of consensus protocols that are described herein may be used.

At block 218, it is determined whether the new block size (i.e. maximum block size or block capacity) has been reached or target block time has been reached. If either condition is not met, the method 200 returns to step 206 to select another transaction until either condition is met. It is likely that each node 120 will run several iterations to select several transactions before the update to the ledger is completed.

When either condition is met, the method 200 proceeds to block 220 where updating of the ledger occurs. If the node 120 is the authoring node 120a (i.e. selected by consensus as the authoring node 120a), updating the ledger comprises sending (or broadcasting) the new block to a plurality of nodes 120 (i.e. peer nodes) to update the ledger in preferably every node 120. If the node 120 is not the authoring node, updating the ledger comprises receiving the new block from the authoring node 120a. The propagation of the new block may be directly from the authoring node 120a or indirectly via an intermediate node 120.

The peer nodes 120 receive the new block and perform validation of the block to ensure that transactions in the new block are valid. After completing the validation, each peer node 120 accepts the new block by updating its ledger with the new state and sends a signal to the network to indicate that their state is updated. Consensus is deemed to be completed when the entire or part of the network accepts the new state. The threshold to define "part of the network" is set by the chain configuration and is usually 50% or more. No further updates to the past state is possible once the new block has been accepted by the nodes 120 as above and forms part of the accepted ledger in the network.

At step 222, synchronisation of the off-chain controllers 128 of every node 120 occurs. This ensures every node 120 has the same indeterministic transactions.

At step 224, the authoring node 120a sends any pending (indeterministic) transactions each with its unique identifier to the off-chain source for fulfilment of the transaction. Thus, if the indeterministic transaction is to query a database, the off-chain source is the database. Once the off-chain source fulfils the transaction, the result and the corresponding identifier are sent back to the node 120 as a deterministic transaction which is processed as described above.

The method 200 described above allows for an indeterministic transaction to be recorded on the blockchain ledger and provides a query-to-completion provenance trail.

A user 102 initiates the process by interacting with a user terminal (or user-facing application) 106. The user 102 may log in through a user interface 108 and selects the action that he or she wishes to perform. The user interface 108 may be a website, desktop application, mobile application, or a computer command-line program. To create a transaction, a request payload is first prepared based on the transaction to be performed. A nonce value, which is a number used only once, is added to the transaction. Finally, the entire request payload is signed with the user's private key 104. The transaction is forwarded to a public API 110. Alternatively, the user 102 may choose to create a transaction directly with the public API 110 without going through the user interface 108.

In an example, a blockchain is used as the distributed ledger network but it would be understood that the same process may be used with other types of distributed ledger networks. In an example, the transaction is an indeterministic transaction such as the query of a database, in particular the query of a federated database 160. The transaction may also be a result of the query of the federated database 160 as explained above. Thus, the user 102 creates or enters the query into the user interface 108 or public API 110. In an example, the query may be for subjects fulfilling the following conditions: Male and below the age of 35.

The user terminal's public API 110 forwards the signed transaction to the node 120 through its interface 122. The interface 122 may be a networking interface such as a remote procedure call (RPC) interface. The signed transaction is authenticated then stored in a transaction pool 124. The transaction pool 124 is a pool of unconfirmed blockchain transactions that are awaiting validation in a blockchain network. In a blockchain network, each node 120 generally contains the same or similar components as described.

Blockchain nodes use a consensus protocol executed by the consensus algorithm module 136 to agree on the blockchain's state that is stored on the blockchain ledger 130. During the consensus round, nodes 120 communicate with each other using a peer-to-peer networking module 132. The consensus protocol may be any suitable consensus protocol used with distributed ledger networks. Examples of consensus protocol that may be used include Proof-of-Work consensus protocol, Proof-of-Stake consensus protocol, Delegated Proof-of-Stake consensus protocol, Proof-of-Authority consensus protocol, Byzantine Fault Tolerance consensus protocol, Delegated Byzantine Fault Tolerance consensus protocol, Proof-of-Burn consensus protocol, Proof-of-capacity consensus protocol and Proof-of-Elapsed Time consensus protocol. During the consensus round nodes 120 seek consensus between themselves to determine which node 120 updates the ledger. As an example, which node 120 is selected as the authoring node 120a to add the new block to the blockchain.

During a consensus protocol round, new transactions may be broadcasted to all node 120 (if not already done previously), each node 120 selects at least one transaction from the transaction pool 124 and performs validation to compute the new state of the blockchain and to prepare a candidate block for addition to the ledger 130. The transactions from the transaction pool 124 are retrieved in the following order—firstly the transactions from the transaction pool are first sorted by the transaction fee of the transaction, and secondly for transactions of the same transaction fee, the transactions are further sorted based on the sender's (or user's) address and its nonce in ascending order. Alternatively, the validation of the transactions may be done after consensus is reached or validation is done twice, and depends in part on the consensus protocol used.

Chain code 126 generally refers to programs that run on the blockchain to implement logic between applications and the ledger. Chain code run in a separate process from the systems functions such as consensus algorithm, network broadcasting, off-chain controllers. Chain code manages the ledger state through a series of state transitions made through transactions submitted by applications. The chain code can be written in a programming language such as JavaScript, Rust, Golang, and is typically used to capture business logic.

The new state of the blockchain may be computed using functions that allows the blockchain to transit from one state to another in the form of a chain code 126. The chain code 126 may contain a business rule or instructions to compute an output based on the provisioning of input parameters, which may be stored in a blockchain ledger 130 or transmitted by the user in the form of a signed transaction. The consensus protocol module 136 may provide a method to select which blockchain node 120 (i.e. the authoring node) can submit its candidate block to be the new added block. For example, in a Proof-of-Work consensus mechanism, the authoring node 120a is the node 120 which manages to broadcast a valid answer for a cryptographic puzzle first.

At the end of a consensus round, the authoring node 120a prepares a final block and updates the ledger 130 by broadcasting or sending it to every node 120 in the network. The new block is added to the blockchain ledger 130, and every node 120 in the blockchain network will maintain an exact copy of the blockchain ledger 130. During the consensus round, off-chain transactions such as off-chain database queries cannot be computed as the consensus protocols are not designed to process these indeterministic queries which relies on information that cannot be found on-chain and maintained by the nodes 120. Transactions that require the knowledge of data that cannot be found on-chain are referred to as off-chain transactions and are instead sent to an off-chain controller 128.

The off-chain controller 128 stores the pending off-chain queries (or transactions) and dispatches them to the off-chain source over the network in the form of a network request after the new block is added. The off-chain controller 128 serves the role of directing the transactions and keeping track of the off-chain transactions. The off-chain controller 128 may be implemented by software, firmware or hardware or any combination thereof. The off-chain controller 128 may also implement request timeout logic to fail a transaction if it exceeds a predetermined time. In an example, the off-chain source is a database, in particular a federated database 160.

A non-transitory computer readable medium may be provided which contains instructions to perform the methods 10, 200 described. The instructions may include selecting the transaction described in step 206, determining if the transaction is deterministic in step 208, sending the indeterministic transaction to the off-chain controller in step 210, validating the transaction and computing the new state in the upcoming new block in step 212, determining if the deterministic transaction was originally an off-chain request in step 214, updating the off-chain controller that the results of a previous off-chain request transaction has been received and to update the status of the previous off-chain request transaction to completed in step 216, and to determine if the update to the ledger is complete (either due to reaching the new block size or the end of the validation round (target block time is reached)) in step 218.

When consensus among the nodes 120 is reached, the authoring node 120a is selected based on the consensus protocol and updating of the ledger occurs. The authoring node 120a sends its new block to the other nodes 120 in the network, while the other nodes 120 receive the new block from the authoring node 120a. The off-chain controller 128 of the nodes 120 synchronise such that the off-chain controllers 128 of the nodes 120 contain the same pending indeterministic transactions. The authoring node 120a further sends any pending indeterministic transactions to the off-chain source for fulfilment of the transaction. Thus, if the indeterministic transaction is to query a database, the authoring node 120a sends any pending indeterministic transactions to the database.

The database retrieves the result data set (or query result set) that matches the query and sends the associated identifier of the transaction and optionally the result data set back to the node 120. The identifier is sent back as a regular signed transaction which is processed by the node 120 in the same manner as it receives the transaction from the user terminal 106. The result data set may be part of the new transaction or may be stored in the off-chain controller. If there is no data in the database that matches the query or the query terminates before completion of the query, the result data set is null. The completion of the query is recorded on the distributed ledger network or blockchain after receiving the result data set, thus the completion recorded includes both when there is data and when there is no data (null) in the result data set. In other words, even if the query terminates prematurely or there is no matching data, it is still recorded in the network.

In an example, the database is a federated database 160 comprising a federation server 162 and a plurality of private data storage 170 (170a, 170b, 170c . . . ). Each private data storage 170 may be a data server which performs access control, differential privacy, and connects to a separate data storage medium such as a database or object storage medium on the cloud such as AWS S3 or Google Cloud Storage. Each private data storage 170 is not connected to each other but is connected to the federation server 162. The federation server 162 may be connected to a federation server storage 164 which may be used to store the results from each private data storage 164. The federation server 162 may also be provided with a private key 166.

In an example, the off-chain controller 128 sends the pending off-chain queries to a federated server 162 of the federated database 160. The off-chain controller 128 further keeps track of the responses of the asynchronous off-chain request. Once the transactions are dispatched, the status of the off-chain queries are marked as pending by the off-chain controller 128. The off-chain controller 128 will await the asynchronous response of the off-chain federated database query and is explained in greater detail below.

The federation server 162 may reside in a separate site from the blockchain nodes 120. The federation server 162 is configured to receive and validate the request from the off-chain controller 128. The federation server 162 is further configured to prepare a query distribution plan based on the query and facilitates the fulfilment of a federated database query. The federation server 162 may receive the request in the form of an API or RPC interface. The authentication may be done using a pre-shared secret key 166 that only the nodes 120 know and may be shared during the setup of the nodes 120 and federation server 162 or configured later. The shared secret key can also validate the integrity of the transaction.

The federation server 162 may also perform other checks to ensure that the user 102 has sufficient privilege or access to make the off-chain request. For example, if a requester (user) 102 does not have sufficient credits to make a federated query, the federation server can invalidate the transaction and send an error code back as a regular signed (deterministic) transaction to be processed by the node 120.

In an example, the federation server 162 may prepare the query distribution plan by splitting the query into multiple filtered conditions according to the data that is stored in the system. For example, if the query below is to fetch female users living in the United States, the federation server 162 will split the query into Q1 (Female users only) and Q2 (Users located in the United States). When one of the private data storage 170a contains the "Gender" attribute, it will receive Q1. When another private data storage 170b contains the "Country' attribute, it will receive Q2. For a query the federation sever 162 may determine only some of the private data storage 170 contain the relevant data to fulfil the query and may send the query to the selected private data storage 170.

Each private data storage 170 may contain its own access control to set rules on what data is shared and where and/or whom the data is shared with. An access control mechanism provides data owners control over their data and the permissions are checked at the access control mechanism. A data scheme file may be provided from the federation server 162 to the private data storage 170 to allow each private data storage 170 to determine the sensitivity of the query if access to the private data storage 170 is allowed by the access control mechanism. The private data storage 170 may scan its data and add a sufficient amount of noise to the data before returning the results (output) to the federation server 162. Each private data storage 170 may check that the output meets the threshold privacy requirements before releasing the output results to the federation server 162. The data owner may configure the access control mechanisms and privacy thresholds accordingly.

In an example, interim results from the private data storage 170 according to the data query plan are received in the federation server 162. The private data storage 170 may return a list of identifiers (IDs) that matches the query that was submitted to them. All the data may be sent back to the node 120 (alternatively a subset of the data or aggregated data may be sent to the node 120 instead), for example by the federation server 162. The interim results may be stored temporarily or permanently in the federation server storage 164. As an example, the data set from each private data storage 170 may be considered a set or a table. If data is not received from one or more private data storage 170 according to the query plan, then it will be marked as a failed database query. Failed queries will also be sent to the off-chain controller 128 as a signed deterministic transaction to be processed by the node 120.

The federation server 162 may further instruct some or all of the private data storage 170 that received the initial query to perform further analytics on the common group of identifiers before finalising the results which is send to the user 102.

Depending on the nature of the query, differential privacy may be applied to produce aggregate-level differentially private information. For example, if a request was made to identify the average age of the data subjects in the private data storage 170, a cryptographic module within the private data storage 170 may be used to add a sufficient amount of noise, perform redaction threshold and data validation before releasing the differentially-private aggregated output back to the federation server 162. For example, if the true average age of the users in the intersection is 34 the differentially-private results for the aggregated average age might be 34.5 (or could even be 34.4, subjected to the amount of noise added to the age attribute of the data) because a mathematical noise has been added to the results. By doing so, an observer or user receiving the output cannot tell if a particular individual's information was used in the computation.

Once the federated database query has been completed by the federation server 162, a response, which is either raw data (including a subset of the raw data) which fulfils the conditions of the query or aggregated data, may be stored to a federation server storage 164 and/or sent to the node (blockchain). The federation server 162 prepares a request payload and use its private key 166 to sign the request payload before broadcasting the signed transaction back to the node (blockchain) where it is processed as described above. Briefly, the transaction will first be sent to the interface 122, sent to a transaction pool 124 and mined into a block which will form the new state in the blockchain ledger 130. During the validation, the off-chain controller 128 identifies that an off-chain data response has been received, and it will mark the off-chain transaction (identified using a Query ID No.) has been completed.

In an example, the systems 100 and methods 10, 200 described herein may be used for In-flight Campaign Optimisation for an advertising or digital marketing campaign. Entities along the marketing chain lack unified standards to reconcile data about their campaigns. (e.g, a demand side platform may have a different standard of a 'confirmed impression' vis-n-vis a supply side platform). The systems 100 and methods 200 described herein provides marketers with real-time visibility of their programmatic campaigns, enabling end-to-end transparency across the impression lifecycle. The systems 100 and methods 10, 200 ingest log-level impression data from individual participants and allows for content authentication, automated reconciliation and authorisation of payments. Such an ingestion of data occurs through parsing a query that emanates from the blockchain layer, through a federation server 162, and then to a participant's private data storage 170. Stitching of log level data occurs on the federation server 162 (reconciling confirmed impressions), and such information is stored on the distributed ledger network or blockchain.

FIG. 4 shows an example of the data that may be found when the systems 100 and methods 200 are applied to the In-flight Campaign Optimisation. As may be seen in FIG. 4 such data may include Impression Identifiers (IDs) amongst others. The impression IDs is matched across different participants in the marketing chain including a demand side platform (DSP), a supply side platform (SSP), and Verifier. The systems 100 and methods 10, 200 described herein allows for the three common Impression IDs (in bold) in the three data sources to be found. This allows the parties to determine how effective the campaign is and to optimise the campaign for example by allocating more resources to a particular platform that may have more Impression IDs to achieve better results. In the example, the data request may be for confirmed impressions from the various data sources. In programmatic advertising, the number of viewable impressions may be obtained by submitting the query to the data source with viewability data information. Viewability data information is whether a given impression has been viewed by users or not. In the programmatic supply chain described such information is obtained by a "verifier", who measures ads integrity. In FIG. 4, the attribute "inViewViewable" is the viewability data information. The result data set may be stored within the federation server storage 164 for this example.

In an example, the systems 100 and methods 10, 200 described herein may be used in a Federated Identity Management Platform. In light of strict data protection regimes, organisations face issues in sharing and transferring personal data. The systems and methods described allow organisations to collaborate and enrich their data on their Data Subjects (viz, customers) without having to share the actual data. Organisations store personal data of their Data Subjects in an 'off-chain' source 170. Typically, the organisation owns their private data storage 170 and may be hosted on the premises of the organisation or another location of their choice. Alternatively, the private data storage 170 may be leased from a provider. Generally, the data owner would also be a user 102, but is not necessarily so. The systems 100 and methods 10, 200 described allows an immutable provenance trail to be kept by recording activities regarding every data subject (e.g, when Data is queried or activated). Every query made on a Data Subject is stored immutably on the ledger 130, which proves helpful in establishing transparency for both the Data Subject and the Data Controller (Organisation). Such a query (after being recorded and authenticated) is communicated from the distributed ledger network or blockchain layer to the federation server 162. The federation server 162 coordinates the query across the various private data storage 170 before returning an output to the user 102 via the distributed ledger network. That output/query result may be stored in a federation server storage 164 and/or on a data storage in the distributed ledger network or blockchain, ensuring a query-to-completion provenance trail.

Figure 5:
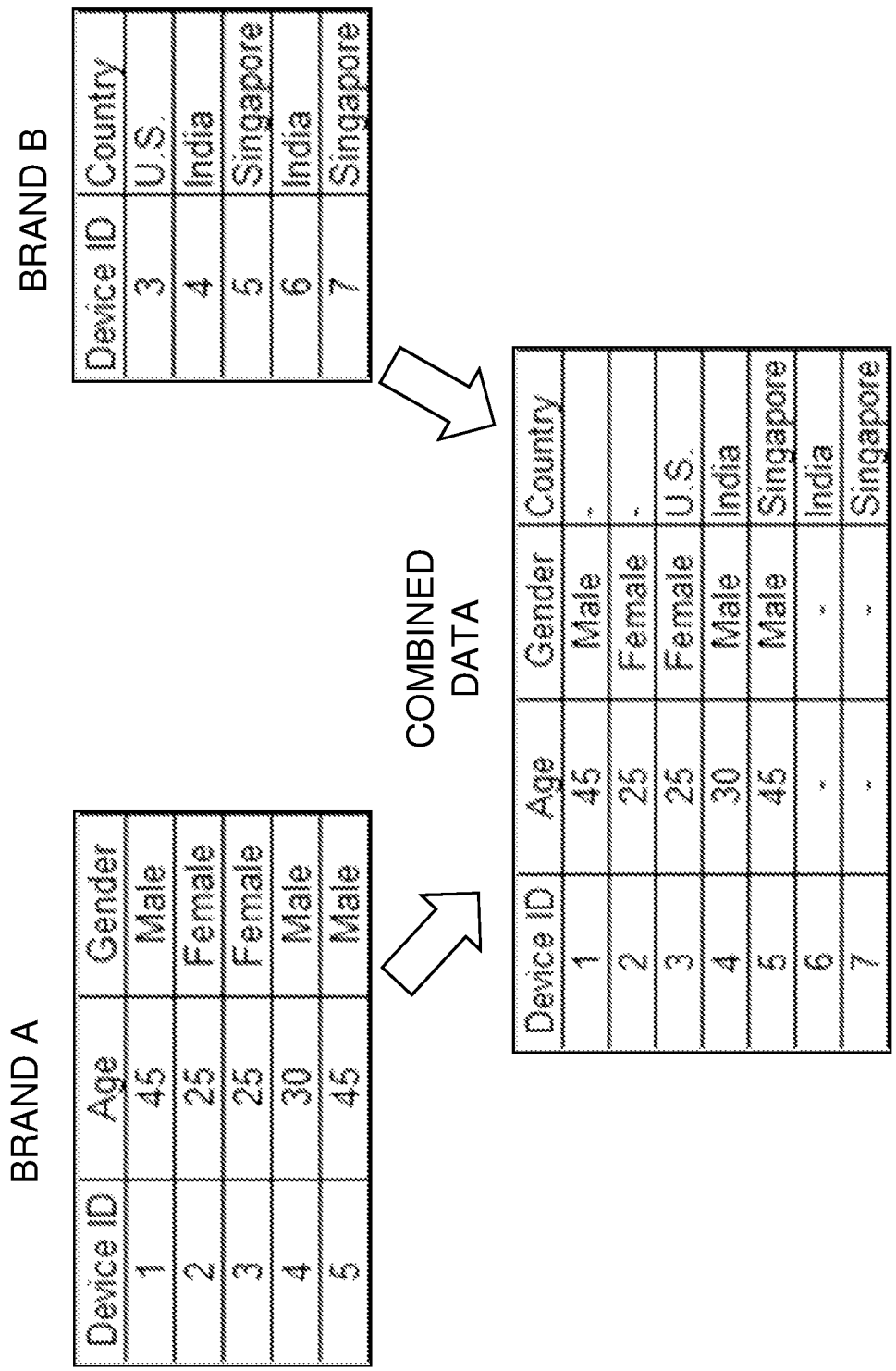
FIG. 5 shows an example of data used in an embodiment of the invention.

FIG. 5 shows an example of data that may be generated from a Federated database 160. Data from two private data storage sources 170a, 170b belonging to Brand A and Brand B are combined as shown in FIG. 5 and the common group of identifiers (Device identifiers in this example) is found. In FIG. 5, the query to the first private data storage 170a belonging to Brand A may be for data subjects in a particular age range of 25-45 and returns a number of Device IDs (or Impression IDs) with the age and gender. The query to the second private data storage 170b belonging to Brand B may be for data subjects residing in certain countries. The combined data shows three common identifiers and may be further analysed for example to reveal the gender. The result data set is subsequently returned to the distributed ledger network as described above. The federation server 162 may be configured to store the data retrieved from the private data storage 170 temporarily and will be deleted once the data is sent to the distributed ledger network or when the query is completed. Alternatively, the result data set may be stored in the federation server storage 164.

The examples described above are greatly simplified to illustrate how the methods 10, 200 and systems 100 are applied. However, it would be appreciated that the amount of data matching the query would be substantially larger. For example, each private data storage 170 may return hundreds or even thousands of data that matches the query. The data from the private data storage 170 are combined to identify the common group of identifiers in the combined data set. The combined data set may be further analysed by one of the private data storages 170. The federation server 162 may send the entire combined data set, the common group of identifiers, or aggregated data. Aggregated data is summarised data of the combined data set, for example it may be counts which fulfil the query.

The systems 100 and methods 10, 200 described herein advantageously allows for data queries to be made from a distributed ledger network or blockchain to a database located external to the network (i.e. off-chain) in a manner that is secure and asynchronous. The transaction (e.g. the database query) is recorded entirely on the distributed ledger network or blockchain thus providing complete provenance of the process. This allows for federated queries that emanate from the blockchain to be made within an indeterministic time of completion and yet allows query-to-completion provenance to be established. The methods 10, 200 and systems 100 described herein provides for non-deterministic queries to be made without consensus failure.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognise, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, processor, fax machine, scanner, or any other programmable device or computer apparatus configured to transmit, process, and/or receive data. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ loadbalancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialised control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behaviour of the embodiments are described without specific reference to the actual software code or specialised hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fibre, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterised based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analogue networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorised users, for example, or another internal network of an organization or commercial entity. As applied herein, an extranet may include a network or internetwork generally limited to a primary organisation or entity, but which also has limited connections to the networks of one or more other trusted organisations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fibre optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier) Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Whilst there has been described in the foregoing description preferred embodiments of the invention, it will be understood by those skilled in the field concerned that many variations or modifications in details of design or construction may be made without departing from the present invention.

What is claimed is:

1. A computer-implemented method of recording an indeterministic transaction on a distributed ledger network, the method comprising
    (a) selecting a transaction from a transaction pool;
    (b) determining if the transaction comprises a deterministic transaction or an indeterministic transaction;
        (i) if the transaction comprises the indeterministic transaction, sending the indeterministic transaction to an off-chain controller, marking the indeterministic transaction as a pending indeterministic transaction, attaching an identifier to the pending indeterministic transaction, and proceeding to step (c);
        (ii) if the transaction comprises the deterministic transaction, computing a new state in an update to a ledger, updating a status of a second indeterministic transaction in the off-chain controller if the deterministic transaction comprises a second identifier of the second indeterministic transaction; and proceeding to step (c);
    (c) determining if a target update time or a maximum update size is reached;
        (i) if the target update time or the maximum update size is not reached, return to step (a);
        (ii) if the target update time or the maximum update size is reached, proceed to step (d);
    (d) updating the ledger;
    (e) synchronising the off-chain controller with other off-chain controllers in the distributed ledger network; and
    (f) if selected as an authoring node, sending pending indeterministic transactions stored in the off-chain controller to an off-chain source for fulfilment of the transaction.

2. The method according to claim 1 further comprising repeating steps (a) to (f).

3. The method according to claim 1 further comprising receiving the transaction and storing the transaction in the transaction pool.

4. The method according to claim 1 wherein the indeterministic transaction comprises querying a database, and wherein sending any pending transactions stored in the off-chain controller to an off-chain source comprises sending a query to the database with the identifier.

5. The method according to claim 1, wherein updating a status of the second indeterministic transaction in the off-chain controller comprises changing the status from pending to completed.

6. The method according to claim 1, further comprising applying timeout logic to fail the pending indeterministic transaction; and sending the identifier of the failed indeterministic transaction back to the transaction pool.

7. The method according to claim 6 further comprising recording the identifier of the failed indeterministic transaction; and creating a new indeterministic transaction with a new identifier to retry the failed indeterministic transaction.

8. The method according to claim 1 wherein upon determining the transaction is the deterministic transaction, the method further comprising validating the deterministic transaction.

9. The method according to claim 1 further comprising selecting the authoring node by a consensus protocol.

10. The method according to claim 1 wherein the distributed ledger network is a blockchain and computing a new state in an update to a ledger comprises computing a new state in an upcoming new block.

11. The method according to claim 1 wherein if the node is the authoring node, updating the ledger comprises sending out the update to a plurality of nodes, otherwise updating the ledger comprises receiving the update from the authoring node.

12. The method according to claim 11 wherein if the node is not the authoring node updating the ledger further comprises validating the update; accepting the update into the ledger; and indicating to the distributed ledger network that the ledger has been updated.

13. A non-transitory computer readable medium comprising instructions that, when executed on a computer, perform the method of recording an indeterministic transaction on a distributed ledger network according to claim 1.

14. A node comprising
   (a) a processor;
   (b) a transaction pool;
   (c) a ledger;
   (d) a networking module to communicate with other devices;
   (e) an off-chain controller; and
   (f) a non-transitory computer readable medium comprising instructions that, when executed on a computer, perform the method of recording an indeterministic transaction on a distributed ledger network according to claim 1.

15. A system comprising a plurality of nodes according to claim 14; and the database.

16. The system according to claim 15 wherein the database comprises a federation server and a plurality of private data storage.

17. The system according to claim 16 wherein the federation server comprises a federation server processor, a federation server storage, and a non-transitory computer readable medium comprising instructions that, when executed by the federation server processor, perform a method of fulfilling a database query, the method comprising receiving and validating the database query from the off-chain controller of an authoring node by the federation server processor; preparing a query distribution plan by the federation server processor, facilitating a fulfilment of the query by the plurality of private data storage by the federation server processor to generate a query result set with an identifier, and sending the identifier back to the authoring node by the federation server processor.

18. The system according to claim 17 wherein the query result set comprises raw data of the query result and/or aggregated data of the query result.

19. The system according to claim 17 wherein each private data storage is configured with personalised access control rules to determine if the query should be fulfilled by an individual private data storage.

20. The system according to claim 19 wherein each private data storage is configured to apply differential privacy in fulfilling the database query.

* * * * *